July 21, 1942.    A. F. KALMAR ET AL    2,290,473
METHOD AND APPARATUS FOR CONTROLLING CONCENTRATION
Filed Jan. 20, 1940    5 Sheets-Sheet 1

INVENTORS:
ARTHUR F. KALMAR
WILLIAM R. HUGUENIN
BY
ATTORNEY

July 21, 1942.     A. F. KALMAR ET AL     2,290,473
METHOD AND APPARATUS FOR CONTROLLING CONCENTRATION
Filed Jan. 20, 1940     5 Sheets-Sheet 3

INVENTORS:
ARTHUR F. KALMAR
WILLIAM R. HUGUENIN

ATTORNEY

July 21, 1942. A. F. KALMAR ET AL 2,290,473
METHOD AND APPARATUS FOR CONTROLLING CONCENTRATION
Filed Jan. 20, 1940   5 Sheets-Sheet 4

INVENTORS:
ARTHUR F. KALMAR
WILLIAM R. HUGUENIN
BY
ATTORNEY

INVENTORS:
ARTHUR F. KALMAR
WILLIAM R. HUGUENIN
BY
ATTORNEY

Patented July 21, 1942

2,290,473

UNITED STATES PATENT OFFICE 2,290,473

METHOD AND APPARATUS FOR CONTROLLING CONCENTRATION

Arthur F. Kalmar and William R. Huguenin, Riverside, Calif., assignors to Food Machinery Corporation, San Jose, Calif., a corporation of Delaware Application January 20, 1940, Serial No. 314,774

11 Claims. (Cl. 99—156)

This invention relates to the treating of fresh farm products with gas in the course of preparing these for shipment to distant markets, and it has particular utility in so treating agricultural product as to retard the growth of decay organisms therein.

It is an object of the invention to provide such a method and apparatus which may be operated relatively easily in railway cars loaded with fresh farm produce.

It is a further object of the invention to provide such a method and apparatus which can be operated to maintain an accurate control of the concentration of gas in effecting such treatments of fresh farm produce in widely varying temperatures, and particularly in relatively low temperatures such as are met with in refrigerator cars.

The manner of accomplishing the foregoing objects as well as further objects and advantages of the present invention will be made manifest in the following description taken in connection with the accompanying drawings, in which.

Figure 1:
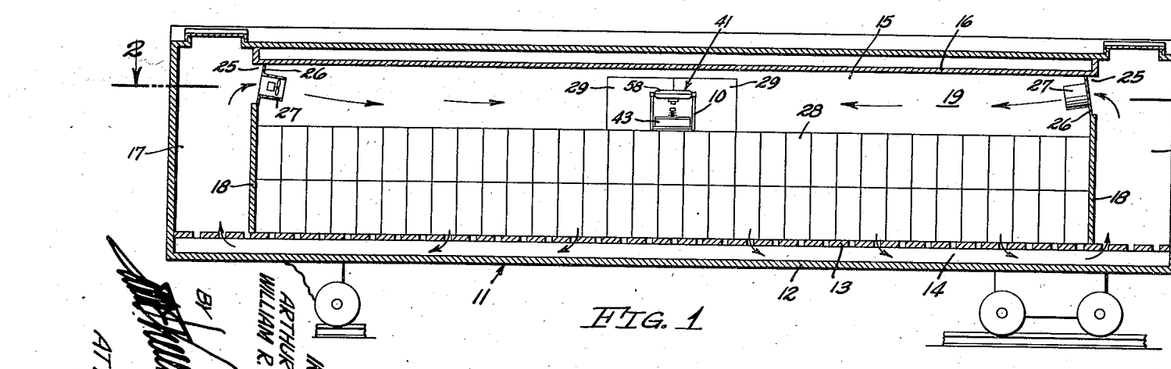
Fig. 1 is a diagrammatic longitudinal sectional view taken on the plane 1—1 of Fig. 2 and showing a refrigerator car packed with boxes of citrus fruit and being gassed by a gas generator comprising a preferred embodiment of the apparatus of our invention.
Figure 2:
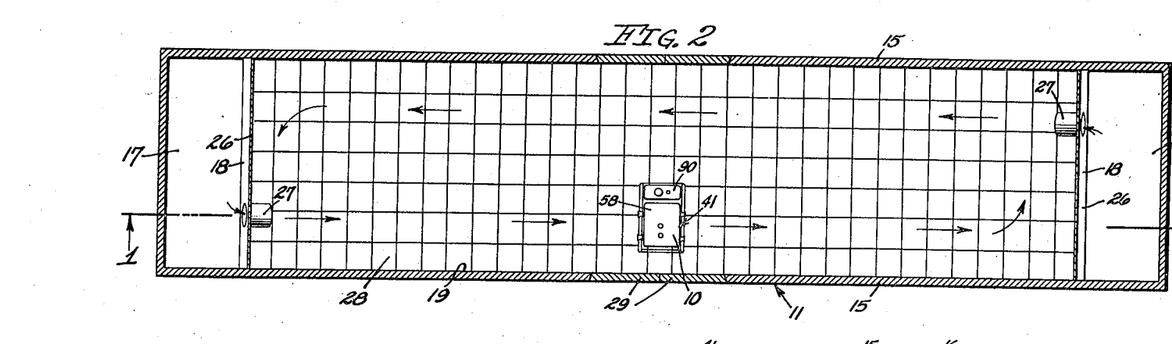
Fig. 2 is a horizontal sectional view taken on the plane 2—2 of Fig. 1.

Referring specifically to the drawings, a gas generator 10 comprising a preferred embodiment of the apparatus of the present invention is shown in Figs. 1 and 2 as installed in the performance of the method of this invention in a refrigerator railway car 11.

The refrigerator car 11 has a floor 12, a foraminous false floor 13 producing a horizontal air passage 14 between these floors, side walls 15, a ceiling 16 and ice bunkers 17 at opposite ends of the car. Transverse walls 18 separate the ice bunkers 17 from the cargo chamber 19 of the car. The upper edges of the walls 18 are spaced from the ceiling 16 to provide air passageways 25 which are equipped with panels 26 upon which are mounted electric fan 27 for causing a circulation of air in the car 11 as indicated by arrows in Figs. 1 and 2 as for the purpose of cooling a cargo 28 of boxes of fruit which may be loaded in the cargo chamber 19. The side walls 15 of the car have double doors 29 through which the cargo 28 is loaded into the chamber 19.

*The gas generator 10*

This generator is designed with particular regard to make it convenient to transport it from place to place and to facilitate its introduction into a car 11 on top of a cargo of fruit 28 after this cargo has been loaded into the car. The apparatus is therefore provided with a wheeled truck 32 having a base 33 on which is fixed a handle 34 by which the truck may be manipulated.

Figure 4:
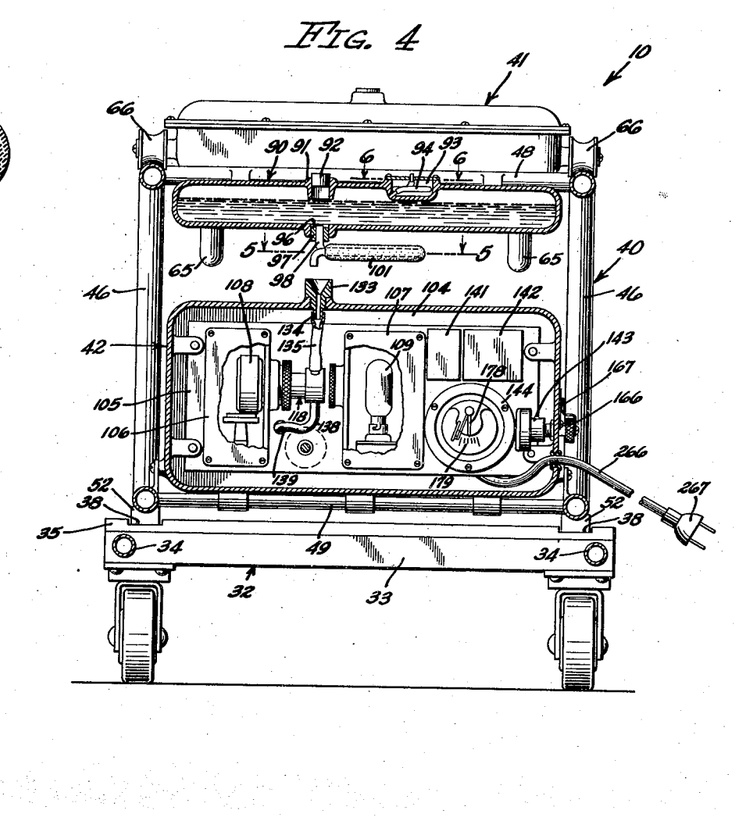
Fig. 4 is a vertical sectional view taken on the plane 4—4 of Fig. 3.

The base 33 is provided with wooden cross bars 35, 36 and 37, the bars 35 and 36 having notches 38 near their opposite ends as shown in Fig. 4. The handle 34 is preferably formed of a piece of bent tubing having opposite vertical portions connected by a cross tube 39.

The gas generator 10 includes a frame structure 40, a reservoir and valve unit 41 for holding and dispensing gas producing chemicals; a mechanism 42 for intermittently testing the content of treating gas in the atmosphere surrounding the generator 10 and controlling the production of such gas; and a chemical mixer 43 having incorporated therewith a tank 44 for storing chemicals which have been used up in the operation of the gas generator 10.

Figure 3:
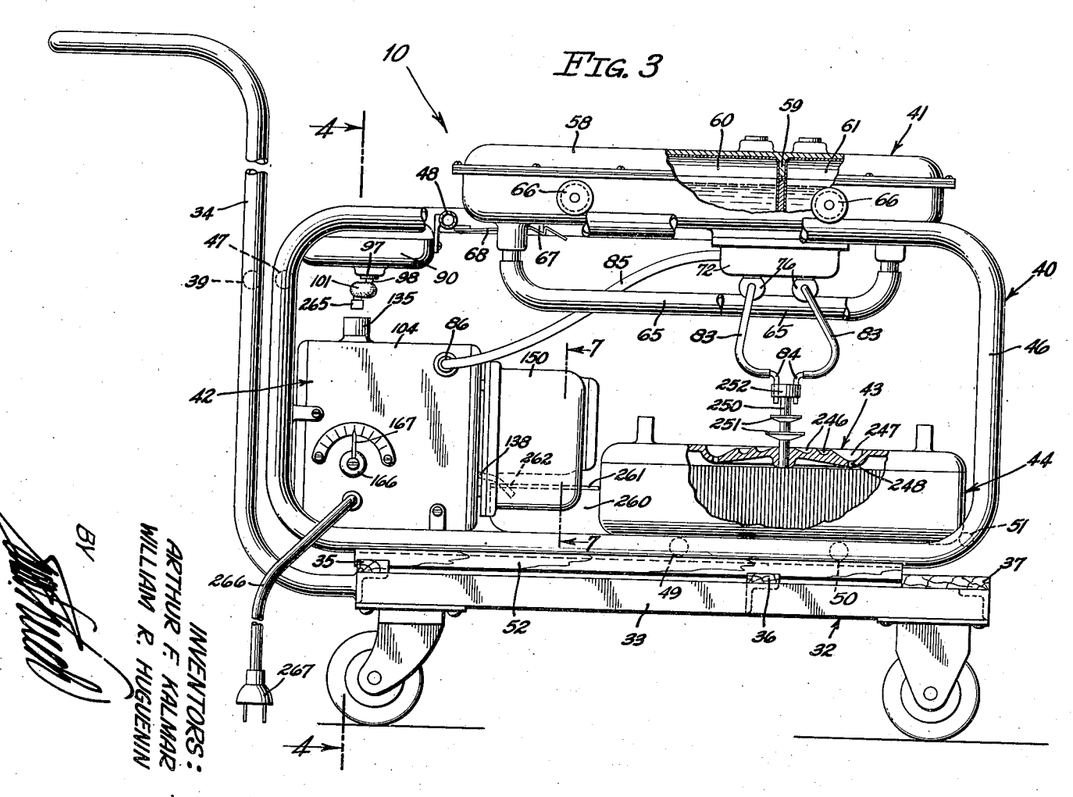
Fig. 3 is an enlarged side elevational view of said generator, partly broken away to illustrate certain details of its structure.

The frame structure 40 comprises two rectangular pipe frames 46 which are disposed vertically in spaced relation and rigidly united by cross tubes 47, 48, 49, 50 and 51 (see Fig. 3). Bolted to lower members of the frames 46 are wooden shoes 52. The generator 10 is adapted to be set in place on the truck 32 with the wooden shoes 52 resting in the notches 38. When so positioned, the cross tube 39 and the cross bar 37 act as stops preventing endwise movement of the generator 10 on the truck 32.

The reservoir and valve unit 41

The unit 41 for holding and dispensing gas producing chemicals comprises a flat tank 58 having a partition 59 which divides the interior thereof into a hypo-chlorite solution reservoir 60 and an acid solution reservoir 61. The tank 58 is provided with a pair of horizontal rests 65 which are adapted to support the unit 41 when it is removed from the generator 10. Mounted on the sides of the tank 58 are flanged wheels 66 which track on upper horizontal portions of the pipe frames 46 as shown in Figs. 3 and 4 so that the unit 41 may be rolled into proper assembled relation with the balance of the gas generator 10. When the unit 41 is thus assembled with the rest of the generator 10, a dog 67 (see Fig. 3) provided on the bottom of the tank 58 engages a spring latch 68 which snaps over this dog and holds the unit 41 in place as shown in Fig. 3.

The unit 41 includes a pair of magnetic valves 70 and 71 which are enclosed in a case 72 secured to the bottom of the tank 58, the valve 70 connecting with the hypo tank 60 and the valve 71 connecting with the acid tank 61. Each of the valves 70 and 71 has a tube 73 having a nipple 74 at its upper end which extends through an aperture in the bottom of the tank 58 and is secured in place by an apertured cap 75. Screwed onto the lower end of the tube 73 is a cap 76 having a duct 77 therein, the upper end of which provides a valve seat and which is normally closed by a valve member 78 gravitating into closed relation with said seat. The valve member 78 has a core 79 formed of magnetic material so that when a solenoid 80 which surrounds the tube 73 is energized, the valve member 78 is lifted, thereby opening the duct 77 and permitting liquid to flow downwardly therethrough from out of the reservoir with which this particular valve is associated.

Figures 7, 8, 9, 10, 11, 12:
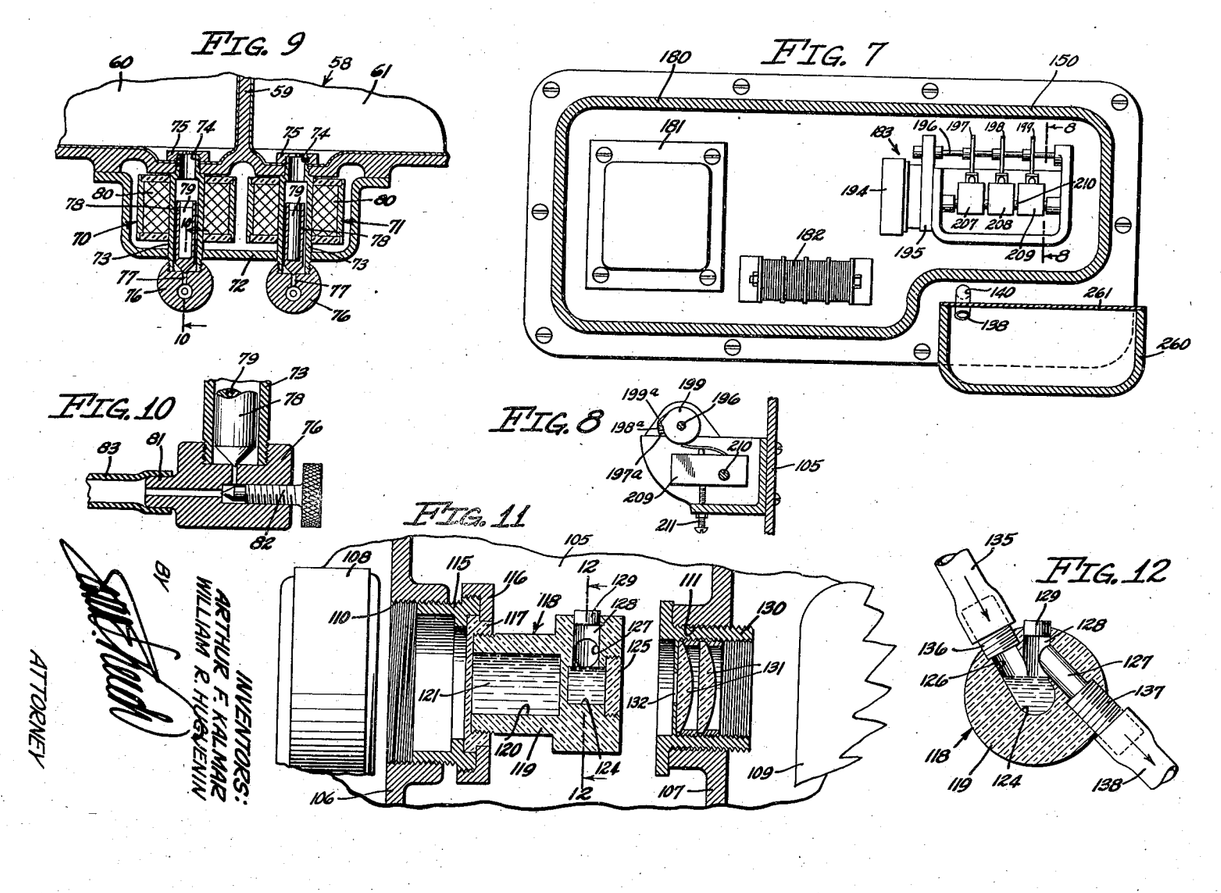
Fig. 7 is an enlarged vertical sectional view taken on the plane 7—7 of Fig. 3.
Fig. 8 is a fragmentary detail sectional view taken on the plane 8—8 of Fig. 7.
Fig. 9 is an enlarged fragmentary detail sectional view taken through the magnetic gas forming chemical supply and control valves of said generator.
Fig. 10 is an enlarged detail sectional view of the lower portion of one of said magnetic valves and is taken on the plane 10—10 of Fig. 9.
Fig. 11 is an enlarged longitudinal vertical sectional view taken through the scanning cell of said generator.
Fig. 12 is a transverse vertical sectional view taken on the plane 12—12 of Fig. 11.

As seen in Fig. 10, each of the caps 76 has a nipple 81 and a needle valve 82, the latter controlling the flow of liquid from the reservoirs 60 and 61 and being adjusted to permit two parts of hypo-chlorite to flow to one part of acid, this being the proportion of these liquids required for the formation of hypo-chlorous acid gas as described hereinafter.

Connecting to each nipple 81 is a flexible rubber tube 83 having a glass elbow nipple 84. The solenoids 80 of the valves 70 and 71 are wired so as to be simultaneously energized by electricity supplied through a cable 85 having a plug 86 at its free end.

The testing mechanism 42

Included in this mechanism is a flat tank 90 (see Figs. 3 and 4) which is permanently mounted on the generator frame 40. This tank has a filler hole 91 which is adapted to receive a stop 92. Mounted in a closed recess 93 in the top of the tank 90 is an air filter 94, one end of which opens outwardly to the atmosphere, the other end of which opens inwardly into the interior of this tank. The filter 94 comprises a coil tube which is filled with coarsely ground peach pit charcoal 95. The bottom of the tank 90 has a hole 96 for receiving a plug 97, through the middle of which is an aperture which snugly receives the upper end of a glass rod 98 having a capillary duct 99 formed throughout the length thereof.

Figures 5, 6:
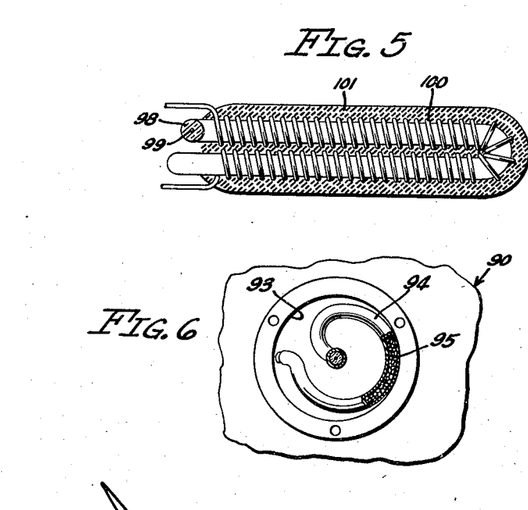
Fig. 5 is an enlarged horizontal sectional view of the capillary testing liquid discharge tube of said generator and the heating element associated therewith and is taken on the plane 5—5 of Fig. 4.
Fig. 6 is an enlarged horizontal sectional view of the atmosphere filter of the treating liquid container of said generator and is taken on the plane 6—6 of Fig. 4.

As shown in Figs. 4 and 5, the glass rod 98 is bent back on itself to form a U-shape, one end of this rod extending upwardly through the stopper 97 and the other end extending straight downwardly. The rod 98 is provided with a coil of electric resistance wire 100 and this wire is then covered with a layer of insulating material 101.

Also fixed permanently on the generator frame 40, just beneath the tank 90, is a housing 104. Mounted inside the housing 104 on a panel 105 are boxes 106 and 107. The box 106 contains a conventional photo-electric cell 108, while the box 107 contains an electric exciter lamp 109. Threaded openings 110 and 111, see Fig. 11, are provided in the respective boxes 106 and 107 on the axis of light passing from the lamp 109 to the photo-electric cell 108. Screwed into the hole 110 is a nipple 115 having a bonnet 116 which holds in assembled relation therewith a cap 117 of a scanning cell 118. The scanning cell includes a body 119, which, when screwed into the cap 117, forms a closed chamber 120 containing a light filtering fluid 121 such as a saturate solution of copper sulphate. The cap 117 and body 119 of the scanning cell 118 are preferably formed of transparent corrosion resisting material such as that put out by the Du Pont Company under the trade name of "Lucite." Also formed in the body 119 of the scanning cell 118 is a scanning recess 124 which is closed with a Lucite plug 125 and which, as shown in Fig. 12, has a tangent inlet opening 126, an overflow outlet 127, and a cleaning opening 128 normally closed by a plug 129. The threaded hole 111 in the box 107 receives a sleeve 130, in which are mounted a series of rectifying lenses 131, causing rays of light originating in the lamp 109 to pursue parallel paths through a central opening 132 in said sleeve and parallel with the light axis above referred to. Thus, these rays of light travel through the scanning cell 118 and impinge upon the photo-electric cell 108.

Mounted in an upper wall of the housing 105 (see Fig. 4) just beneath the discharge end of the capillary duct 99 is a funnel 133 having a nipple 134 which extends into the housing and is connected by a rubber tube 135 to a nipple 136, the latter being screwed into an outer threaded portion of the inlet opening 126 of the scanning cell 118 as seen in Fig. 12. The overflow outlet passage 127 has a nipple 137 which connects with a rubber tube 138, the latter passing through a hole 139 in the panel 105 and out of the housing through a hole 140 (see Fig. 7) with which this tube makes a snug, airtight fit.

Also mounted on the inside wall of the housing 104 is a single coil relay 141, a double interlocking relay 142, a rheostat 143 and a microamp relay 144, the latter being substantially like the device disclosed in U. S. Letters Patent No. 2,062,915, issued December 1, 1936, to A. H. Lamb.

Figures 13, 14:
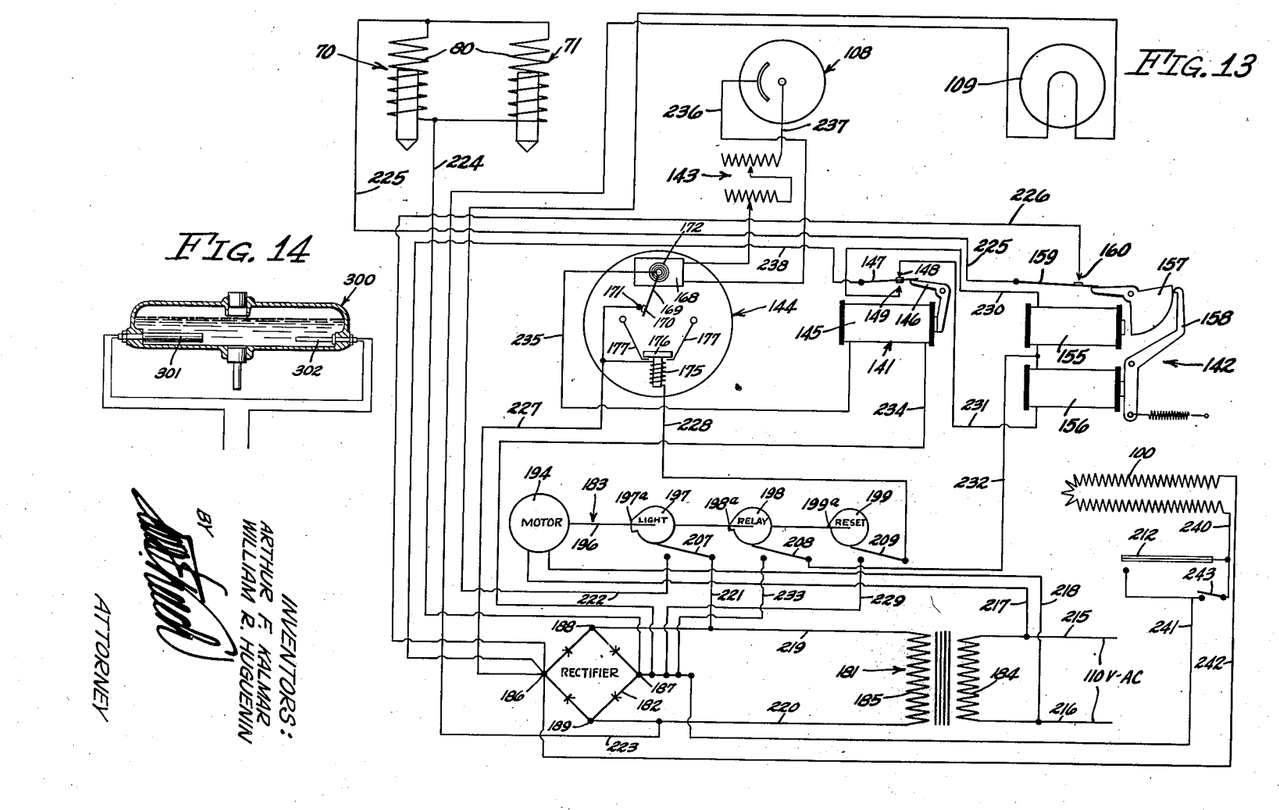
Fig. 13 is a diagram of the wiring of said generator.
Fig. 14 is a diagrammatic vertical sectional view of a modified form of the testing liquid supply tank of said generator.

The relay 141 shown diagrammatically in Fig. 13, includes a coil 145 for actuating a bell crank 146 which, when thus actuated, operates a switch arm 147 so as to cause the latter to engage one or the other of two stationary contacts 148 and 149.

The double interlocking relay 142 includes coils 155 and 156, the coil 155 operating a pivoted lever 157 and the coil 156 operating a latch lever 158. Operated by the lever 157 is a single switch arm 159 having a stationary contact 160.

The rheostat 143 (see Fig. 4) is actuated by a shaft 165 which extends through the wall of the housing 104 and has a knob 166 and a pointer 167 for graduated adjustment of the rheostat.

The micro-amp relay 144 is shown diagrammatically in Fig. 13 and includes a moving coil 168 to which an oscillating switch arm 169 is fixed, the latter having a permanently magnetized contact 170 thereon. Positioned for engagement with the contact 170 is a stationary permanently magnetized contact 171, the arm 169 being normally urged into engagement with the contact 171 as shown in Figs. 4 and 13 by a hair spring 172. The relay 144 also has a solenoid 175 having a vertically movable core 176 for actuating a pair of fingers 177 in the manner and for the purpose described in the aforesaid Lamb patent. As disclosed in said patent, and as shown in Fig. 4 of this application, a pointer 178 is provided so as to pivot about the same axis with the arm 169 for registration selectively with one of a series of graduations 179. The pointer 178 normally remains stationary and is adjustable manually to increase or decrease the tension exerted on the switch arm 169 by the hair spring 172.

Rigidly mounted on the housing 104 in spaced relation therewith for the purpose of heat-insulating it from said housing, is a secondary housing 180, the interior of which is shown in Fig. 7. The housing 180 is provided for containing all of those elements of the mechanism 42 which tend to become heated with use so that the heat from these elements will not be transferred to the delicate apparatus contained in the housing 104. The secondary housing 180 has mounted therein a transformer 181 a rectifier 182 and a motor driven cam switch unit 183.

The transformer 181 (see Fig. 13) has primary and secondary windings 184 and 185. The rectifier 182 has terminals 186, 187, 188 and 189. The motor switch unit 183 includes a synchronous electric motor 194 which operates through reduction gears 195 to drive a shaft 196 having cams 197, 198 and 199 mounted thereon. As shown in Fig. 8, these cams have lobes 197a 198a and 199a respectively. Below these cams are micro switches 207, 208 and 209 respectively, these switches being pivoted on a rod 210 as shown in Fig. 8 and being adjustable by screws 211.

Provided on the generator 10, in suitable position where it is exposed to the temperature of the atmosphere surrounding the generator, is a thermostat 212, shown diagrammatically in Fig. 13.

The electric system of the generator 10 as shown in Fig. 13, includes four separate circuits: a 110 v.-A. C. circuit obtained from power lines; a 10 v.-A. C. circuit obtained from the transformer 181; a 10 v.-D. C. circuit obtained from the rectifier 182; and a "micro-amp" circuit generated by the photo-electric cell 108, these four circuits now being described in the order above named.

The elements energized by the 110 v.-A. C. circuit include the primary coil 184 of the transformer 181 and the motor 194. The 110 v.-A. C. current is supplied through lead wires 215 and 216 which lead to the primary coil 184 of the transformer 181. Leading from the wires 215 and 216 to the motor 194 are wires 217 and 218.

The current of the 10 v.-A. C. circuit is excited in the secondary 185 of the transformer 181 and this energizes the rectifier 182 and the exciter lamp 109. Connecting opposite ends of the secondary 185 with the terminals 188 and 189 of the rectifier are wires 219 and 220. Extending from the wire 219 to the light switch 207 is a wire 221; from this switch to the light 109 is a wire 222; and from the wire 220 to the light 109 is a wire 223.

The 10 v.-D. C. circuit receives its current from terminals 186 and 187 of the rectifier 182, this circuit energizing the solenoids 80 of the valves 70 and 71, the solenoid 175 of the microamp relay 144, and the coils 145, 155 and 156 of the relays 141 and 142.

Connecting one end of each of the valve solenoids 80 with the terminals 187 of the rectifier 182 is a wire 224. The opposite ends of the solenoids 80 are connected to the switch arm 159 by a wire 225. The circuit for energizing the solenoids 80 is completed by a wire 226 extending from the terminal 160 to the rectifier terminal 186.

Connecting the rectifier terminal 186 to the contact 171 of the relay 144 is a wire 227. This wire also leads to one end of the solenoid 175 of this relay. The opposite end of the solenoid 175 is connected by a wire 228, to one terminal of the reset switch 209, the other terminal of this switch being connected with the terminal 187 of the rectifier 182 by a wire 229. Connecting the stationary contacts 148 and 149 of the relay 141 with one end of each of the coils 155 and 156 of the relay 142 are wires 230 and 231 respectively, the opposite ends of the coils 155 and 156 being jointly connected by a wire 232 to one terminal of the cam operated relay switch 208, the other terminal of the latter being connected by a wire 233 to the rectifier terminal 187. Connecting one end of the coil 145 of the relay 141 to rectifier terminal 187 is a wire 234, the opposite end of the coil 141 being connected to switch arm 169 of the microamp relay 144 by a wire 235. The position of the switch arm 147 of the relay 141 determines which of the two coils 155 or 156 of the relay 142 is to be energized by the 10 v.-D. C. circuit as hereinafter described.

The micro-amp circuit between the photoelectric cell 108 and the relay 144 as seen in Fig. 13 comprises a pair of wires 236 and 237 leading to the moving coil 168 of the relay 144, the wire 237 embracing the rheostat 143.

Connecting the rectifier terminal 186 to the switch arm 147 of the relay 141 is a wire 238. One terminal of the thermostatic switch 212 is connected by a wire 240 to one end of the coil 100 while the other terminal of this thermostat is connected by a wire 241 to the rectifier terminal 187. The opposite end of the coil 100 is connected by a wire 242 to the rectifier terminal 186.

Interpositioned between the wire 240 and the wire 241 so as to cut out the thermostat 212 where this is desired, is a manually operated switch 243.

The chemical mixer 43

The mixer 43 comprises the cover for the tank 44 and has formed therein a series of annular concentric recesses 246 and an annular recess 247 encircling these somewhat deeper than the others, there being drain holes 248 connecting the lowermost points in the recess 247 with the tank 44. Mounted in the mixer 43 to extend upwardly therefrom on the axis of the recesses 246 and 247 is an acid resisting stem 250, having mounted thereon a series of cups 251 and a head member 252, the latter being provided with suitable vertical holes in which the L nipples 84 may be loosely received as shown in Fig. 3. Thus, any liquids discharged from the nipples 84 are retained temporarily and mixed as they flow downwardly into and from the cups 251 and the annular recesses 246. When these liquids finally gravitate to the recess 247, they drain through the drain holes 248 into the tank 44 which is provided for the purpose of collecting spent chemicals used up in the performance of the process of our invention.

Formed integral with the tank 44 (see Figs. 3 and 7) is a subordinate chemical reservoir 260 having a cover 261, the latter having an opening 262 downward into which the lower end of the tube 138 extends.

Operation.

The gas generator 10 of our invention, as already pointed out, is especially adapted for use in gassing a cargo of fresh farm products in a railway refrigerator car. Figs. 1 and 2 illustrate the process as this takes place in the car 11. This process may be performed before, after or during the precooling of the cargo 28 of fresh fruit in the car. Whichever is the case, the fan panels 26 are installed in the openings at the upper end of the walls 18 and electric power provided for the fans 27 so that these run continually during the operation of the process to circulate the atmosphere in the car as indicated by the arrows in Figs. 1 and 2. If it is desired to perform the process during the precooling of the cargo 28, the ice bunkers 17 are filled with cakes of ice so that the air in the cars is cooled as it passes through these bunkers. The process of the invention is preferably carried on concurrently with the precooling of the cargo 28 as double use is thus made of the time period as well as the power required for driving the fans 27 for accomplishing these processes.

As will be noted in Fig. 2, the fans 27 are preferably offset relative to each other at opposite ends of the car so as to cause a rotary motion of the air in the space between the cargo and the ceiling 16 of the car. This tends to give a wider diffusion to the treating gas which is produced by the generator as will be presently described.

It is one of the objects of the process of our invention to permit the gassing of fruits at varying temperatures including particularly those met with in precooling fresh farm produce. For the gassing process to be effective and yet not burn the produce, the concentration of the gas must be maintained uniform throughout the storage space and within very narrow limits.

The function of the generator 10 is to produce gas at such a rate as to maintain the required concentration of gas in the air in the car throughout the period which the process must be carried on to kill the decay organisms present on the fruit. To perform this function, the generator operates automatically in the following manner:

The generator is prepared for service before being installed in the car, by filling the tanks 60 and 61 with sodium hypo-chlorite solution and acid solution respectively, flow of the solutions from the tanks 60 and 61 being prevented by the valve members 78 which are normally closed as seen in Fig. 9. At the same time, the tank 90 is filled with a testing liquid which is preferably a solution of orthotolidine. A cap 265, placed on the discharge end of the capillary tube 98 as seen in Fig. 3 prevents the flow of orthotolidine when the generator 10 is not in use. The generator 10 is now ready to be placed in the refrigerator car. As one man generally has to handle this generator alone, it is especially designed to be easily handled by one man in placing this in the car and removing it therefrom. When disassembling the generator to handle it in this manner, the plug 86 is removed from its socket in the housing 104 which plug and socket constitute a connection in the wires 224 and 225. The elbows 84 are slipped out of the holes for loosely receiving these in the head 252 of the chemical mixer 43. The spring latch 68 is then lowered, and the reservoir and valve unit 41 is lifted and set aside by the operator. The chemical mixer 43 with its associated tank 44 is now also removed as a unit from the balance of the generator and set to one side.

Assuming that the cargo 28 has now been packed in the car 11 as shown in Figs. 1 and 2, and one pair of the car doors 28 left open, the operator removes from the truck 32 the balance of the generator which comprises the frame 40 and the testing mechanism 42, and inserts this through the open car door onto the top of the cargo in the position in which the generator is shown in these figures.

The chemical mixer 43, with its associated tank 44 is now lifted by the operator and slid into place in the generator so as to rest on the frame cross members 49 and 50 and be lodged back of the cross member 51, the operator taking care in this step to see to it that the lower end of the rubber tube 138 extends downwardly through the opening provided in the cover 261 for the reservoir 260.

The operator now lifts the reservoir and valve mechanism 41 and inserts it through the space between the upper edge of the car door and the frame 40 so that the rollers 66 rest on this frame and rolls the unit 41 inwardly on the frame until the dog 67 moves into latching engagement with the latch 68 as shown in Fig. 3. The operator then inserts the plug 86 of the cable 85 into the receptacle provided therefor on the housing 105 and inserts the glass elbows 84 into the openings provided for these in the head 252 of the chemical mixer stem 250.

The wires 215 and 216 are led into the housing 104 through a cable 266 having a plug 267 which is now plugged into a suitable 110-volt outlet so as to energize the generator 10.

The electrical circuit to the fans 27 which have previously been installed in the car is now energized so as to set up a circulation of air in the car as indicated by the arrows in Figs. 1 and 2.

The car doors 29 are now closed, the cables supplying electricity to the fans and the gas generator passing through the space between the doors and being accommodated by the yieldable packing usually provided for these doors.

The first thing which takes place when the process of our invention is first set in operation is that the testing mechanism 42 operates to open the magnetic valves 70 and 71 to permit hypochlorite and acid solutions to flow downwardly through these valves, the tubes 83 and the glass elbows 84, into the uppermost of the cups 251. Here the mixing of these solutions starts and is carried on to completion as they flow downwardly together over the exposed surfaces of the chemical mixer 43. As these solutions are mixed, they react, setting free hypo-chlorous acid gas which escapes into the atmosphere within the car. By the time the mixed solutions have reached the outermost annular recess 247, this chemical reaction is practically complete and the exhausted mixture of solutions drains downwardly through the openings 248 into the tank 44.

As this gas is produced, it is continually mixed with the atmosphere in the car 11 by the circulation of air therein so that the concentration of this gas, in any one part of this atmosphere, is the same as the concentration of gas in any other part of said atmosphere. As the production of gas continues, however, the concentration of gas everywhere in the atmosphere in the car increases until it approaches that value at which it is desired that this concentration be maintained constant by the generator 10.

From the time the generator 10 is first set in operation, the testing mechanism 42 functions to test the concentration of gas in the atmosphere in the car at predetermined intervals, and preferably about every two minutes. When making each such test, the mechanism 42 opens the valves 70 and 71 or permits these to remain open if the concentration of gas is below the desired concentration. On the other hand, it shuts these valves off or allows them to remain closed if the concentration of gas in the atmosphere in the car should exceed this desired concentration.

The first step of testing the concentration of gas in the atmosphere is accomplished by exposing uniform quantities of orthotolidine solution to said atmosphere and dropping this solution through said atmosphere in droplets and then collecting it in the scanning cell 118. Due to its exposure to said atmosphere containing hypochlorous acid gas, the orthotolidine changes color, the depth of this color varying in direct proportion to the concentration of said gas in said atmosphere. In each of these periodic tests which is automatically carried out once every two minutes by the mechanism 42, the exciter lamp 109 is illuminated so as to cast a beam of light through the scanning cell 118 and against the photo-electric cell 108. The amount of light which reaches the photo-electric cell is inversely proportionate to the depth of color in the orthotolidine solution resting in the scanning cell 118. The photo-electric cell 108 generates a very small electric current when excited with a beam of light and the current thus generated is in direct proportion to the strength of that beam of light. Thus, the current generated by the photo-electric cell during each of the tests carried out by the mechanism 42 is in inverse proportion to the concentration of gas in the atmosphere in the car. The mechanism 42 responds to the current thus generated by the photo-electric cell 108. When this current is above a certain value (thereby indicating a deficiency in the concentration of gas in the atmosphere in the car 11), the magnetic valves 70 and 71 will be opened if previously closed, or they will be maintained open if previously open, so that the production of gas by the generator 10 will continue following this test, and during the period between this test and the next test.

When, during any of these tests, the amount of current produced by the photo-electric cell 108 is below a certain value, thus indicating that the concentration of gas in the atmosphere in the car 11 exceeds the value at which it is desired to maintain this concentration, then the testing mechanism 42 functions to shut the valves 70 and 71 if these were previously open, or to maintain them shut if they were previously shut. When these valves are closed, of course, the flow of chemical to the mixer 43 is stopped so that the generator 10 ceases to generate gas.

We have found that this process as just described gives an inaccurate check on the concentration of the gas when performed at widely varying temperatures, and particularly when performed at temperatures varying between normal mid-day temperatures and the temperatures produced in a refrigerator car by precooling the fruit with a circulation of air through the car with iced bunkers. We also discovered that the difficulty here encountered was due to the degree of reaction by orthotolidine with the hypo-chlorous acid gas fluctuating with these changes in temperature during operation of the process.

Our present invention, therefore, embraces the step of maintaining the orthotolidine at a substantially uniform temperature as it is discharged into contact with the atmosphere, or at least maintaining the orthotolidine at a temperature above a certain critical temperature below which the reaction of the orthotolidine to the gas in the atmosphere is not uniform. The critical temperature above which we have found it advisable to maintain the orthotolidine at the time it is discharged into contact with the atmosphere, is 70° F. We have found that reasonable variations in the temperature of the orthotolidine above this point do not greatly influence the reaction of the orthotolidine to the gas in the atmosphere.

The resistance element 100 is so designed that when constantly energized with a direct current of 10 volts it will supply sufficient heat to the orthotolidine flowing through the capillary tube 98 so that, when the generator 10 is operating in an atmosphere having the lowest temperature met with in precooling of railway cars, the orthotolidine flowing through this tube will be warmed to a temperature of over 70° F. When the heater 100 is thus constantly energized and the generator 10 is used in atmospheric temperatures considerably higher than those met with in precooling railway cars such, for instance, as in storage rooms, packing houses and the like, the orthotolidine passing through the capillary tube 98 will of course be heated to a somewhat higher temperature by the heater 100, but this will not make any substantial difference in the reaction of the orthotolidine to the gas in the atmosphere surrounding the generator, so that the generator will still accurately respond to the concentration of gas in the atmosphere to maintain this within the limits necessary for giving adequate treatment to the fruit without burning the latter.

A complete cycle of the operation of the generator 10 will now be described in detail. When the generator is first installed in the car 11 as shown in Figs. 1 and 2, and the car doors closed as hereinbefore described for the performance of the process of our invention, all three of the electrical circuits, to wit, the 110 v.—A. C. circuit, the 10 v.—A. C. circuit and the 10 v.—D. C. circuit, are energized. This causes the electric motor 194 to continuously rotate the shaft 196 and the cams 197, 198 and 199 fixed thereon. The motor is so geared to this shaft that the latter preferably makes one rotation every two minutes. During each revolution, the cam lobes on the cams 197, 198 and 199 engage and temporarily close the switches 207, 208 and 209 so as to effect a testing of the content of gas in the atmosphere in the car 11, each such test being completed within a period of about ten seconds. As shown in Fig. 13, the lobe 197a of the cam 197 is larger than the lobes 198a and 199a. This causes the switch 207 to close prior to the switches 208 and 209 and to remain closed longer than the latter two. Closing the switch 207 closes the 10 v.—A. C. circuit to the exciter lamp 109 which throws a beam of light through the scanning cell 118, filter cell 120, and into the photo-electric cell 108, the latter thus being caused to discharge electrical current which energizes the moving coil 168 of the relay 144.

Immediately after the lamp 109 is lighted by the closing of the switch 207, the switch 209 is momentarily closed by the cam 199 to reset the switch arm 169 of the micro-amp relay 144. Closing of the switch 209 closes the 10 v.—D. C. circuit from the rectifier 182 to the solenoid 175 of the relay 144 and causes the core 176 of that solenoid to swing the fingers 177 inwardly, this centralizing the switch arm 169. Upon the opening of the switch 209 which immediately follows, the solenoid 175 is de-energized, the fingers 177 separate and the relay arm 169 is released.

When the moving coil 168 is energized by a current from the photo-electric cell 108, the coil 168 tends to swing the switch arm 169 rightward away from the magnetic contact 171 against the influence of the hair spring 172. When the gas concentration in the car 11 is below the desired minimum, the orthotolidine solution in the scanning cell 118 is relatively clear, thus allowing a substantial amount of light to pass from the lamp 109 to the photo-electric cell 108. The current generated by the photo-electric cell 108 is thus sufficient to cause the moving coil 168 of the relay 144 to maintain the switch arm 169 out of engagement with the contact 171, thus breaking the circuit to the coil 145 of the relay 141 and permitting the switch arm 147 of the latter to remain in contact with the terminal 148. When the switch arm 147 is in this position, the circuit is closed through the wire 230 to the coil 155 of the relay 142 and when the cam operated switch 208 is closed by the cam 198, the circuit from the rectifier 182 to the relay 142 is completed to energize the coil 155. The latter is thus caused to move the lever 157 which lifts the switch arm 159 upwardly against the terminal 160, thereby closing the electric circuit of the solenoids 80 of the valves 70 and 71. This lifts the valve members 78 and allows the hypo-chlorite and acid solutions to flow downwardly through these valves and be discharged from the glass elbows 84 into the chemical mixer 43, thereby producing hypo-chlorous acid gas as described hereinabove.

The lever 157 of the relay 142 is retained in operative position (after the circuit to the coil 155 is broken), by the latch lever 158 in order to maintain the valves 70 and 71 in open position. This results from the fact that the latch lever 158 is spring-biased inwardly as shown in Fig. 13 and whenever the magnet 156 is not energized and the lever 157 is rotated by the energizing of the magnet 155, the latch lever 158 swings into place to hold the lever 157 in its rotated position in which it holds the switch arm 159 upwardly against the terminal 160.

As long as the concentration of gas in the car 11 is less than the minimum predetermined as desirable in the process of our invention, the generator 10, upon each succeeding testing operation as above described, operates in the same manner as set forth to retain the valves 70 and 71 in open position.

When the concentration of gas in the car 11 exceeds the predetermined maximum allowable, the production of gas by the generator 10 is stopped in the following manner:

The amount of gas now present in the air is sufficient to darken the orthotolidine dropping through the atmosphere to such a point that when the latter flows down into the scanning cell and the next test takes place, the amount of light transmitted through the scanning cell to the photo-electric cell 108 is reduced and causes a proportional reduction in the amount of current generated by the cell 108. When the switch arm 169 of the relay 144 is again centralized and subsequently released by the finger 177 in response to the momentary closing of the switch 209, an insufficient amount of current is received by the moving coil 168 to overcome the force exerted on the switch arm 169 by the hair spring 172, whereupon the arm 169, when released by the arms 177, swings to the position in which it is shown in Fig. 13 with the contacts 170 and 171 in engagement. The latter engagement closes the circuit from the rectifier 182 to the coil 145 of the relay 141 so as to actuate the lever 146 and move the switch arm 147 into engagement with the terminal 148, thus joining the wires 238 and 231 and enabling the coil 156 of the relay 142 to be energized when the switch 208 is closed by the cam 198. When the coil 156 is thus energized, the latch lever 158 is moved out of engagement with the lever 157, causing the switch arm 159 to move downwardly away from the contact 160 so as to break the circuit to the valves 70 and 71 and cause the latter to stop the flow of the gas forming liquids downwardly to the mixer 43.

Throughout the operation of our process, the checking of the concentration of the gas in the atmosphere within the car 11 takes place once each two minutes as above described, and the gas-producing apparatus of the generator 10 is thus automatically controlled so as to maintain said concentration within the necessary predetermined range of values.

The rheostat 143 permits adjusting the generator 10 so as to vary the range of values which are maintained in the concentration of gas by the generator 10. This is done by regulating the amount of current permitted to pass from the photo-electric cell 108 to the micro-amp relay 144.

In the preferred mode of operating the apparatus of our invention, the switch 243 is closed so that the heating element 100 as heretofore described is continuously energized. In case the process is to be performed in an atmosphere the temperature of which varies between excessive extremes, the switch 243 is opened so that the supply of current to the heating element 100 is controlled by the operation of the thermostatic switch 212 which is located in the atmosphere in which the process is operating. In this way, when the temperature of the atmosphere in which the process is being performed is high enough so that heating of the orthotolidine solution is unnecessary, this is avoided.

Referring now to Fig. 14, a modified form of orthotolidine tank 300 is shown here, this tank being equipped with a heater 301, the supply of current to which is controlled by a thermostatic switch 302, both heater and switch being submerged in the orthotolidine in the tank. When using the tank 300 in the process of our invention, all of the orthotolidine in this tank is maintained at a temperature within the range where the orthotolidine will react uniformly when contacting the gas contained in the atmosphere in which the process is being performed.

The herein disclosed process, while particularly useful in treating citrus fruits as specifically disclosed, is equally capable of broad application to edible or fresh farm products of all kinds as contemplated in the specification. Therefore the term "fruit" as used in the claims is not to be construed as limiting the claims to any particular type of edible product.

We claim:

1. In the gas treatment of fruit under varying temperature conditions, the method of confining said fruit in a chamber, liberating a treating gas into the atmosphere within said chamber, passing through the atmosphere in said chamber a control agent of orthotolidine which contacts and reacts with said gas, maintaining said control agent within a range of temperatures in which its reaction with said gas will be substantially uniformly in proportion to the concentration of said gas in said atmosphere regardless of the fluctuations in the temperature of said atmosphere, testing the extent of said reaction between said gas and said control agent, and adjusting the concentration of said gas in said atmosphere in accordance with the reaction between said gas and said agent.

2. In the gas treatment of fruit under varying temperature conditions, the method of confining said fruit in a chamber, liberating a treating gas into the atmosphere within said chamber, passing through the atmosphere in said chamber a control agent of orthotolidine which contacts and reacts with said gas, maintaining said agent within a range of temperatures in which its reaction with said gas will be substantially uniformly in proportion to the concentration of said gas in said atmosphere regardless of the fluctuations in the temperature of said atmosphere, periodically testing the extent of said reaction between said gas and said control agent, and adjusting, between successive tests, the concentration of said gas in said atmosphere as necessity for this is indicated in the latest of said tests by the extent of said reaction between said gas and said agent.

3. In the gas treatment of fruit under varying temperature conditions, the method of confining said fruit in a chamber, liberating hypochlorous acid gas into the atmosphere within said chamber, passing a solution of orthotolidine through the atmosphere in said chamber, maintaining said orthotolidine within a range of temperatures in which its reaction with said gas will be substantially uniformly in proportion to the concentration of said gas in said atmosphere regardless of the fluctuations in the temperature of said atmosphere, testing the extent of said reaction between said orthotolidine and the gas in said atmosphere and adjusting the concentration of said gas in said atmosphere as necessity for this is indicated by the extent of said reaction between said gas and said orthotolidine.

4. In the gas treatment of fruit under varying temperature conditions, the method of confining said fruit in a chamber, liberating hypochlorous acid gas into the atmosphere within said chamber, passing a solution of orthotolidine through the atmosphere in said chamber, maintaining said orthotolidine within a range of temperatures of about 70° F. to about 110° F., testing the extent of the reaction between said orthotolidine and the gas in said atmosphere, and adjusting the concentration of said gas in said atmosphere as necessity for this is indicated by the extent of said reaction between said gas and said orthotolidine.

5. In the gas treatment of fruit under varying temperature conditions, the method of confining said fruit in a chamber, liberating hypochlorous acid gas into the atmosphere in said chamber, passing a solution of orthotolidine through the atmosphere in said chamber, maintaining said orthotolidine at a temperature above 70° F., testing the extent of the reaction between said orthotolidine and the gas in said atmosphere, and adjusting the concentration of said gas in said atmosphere as necessity for this is indicated by the extent of said reaction between said gas and said orthotolidine.

6. In the preparation of fresh fruit for market, the method of confining said fruit in a chamber, setting up a circulation of the air in said chamber, cooling said air at one or more points in the circulation thereof, introducing mold inhibiting gas in said air at one or more points in the circulation thereof, passing through the atmosphere in said chamber an orthotolidine control agent which contacts and reacts with said gas, maintaining said agent within a range of temperatures in which its reaction with said gas will be substantially uniformly in proportion to the concentration of said gas in said atmosphere, regardless of the fluctuations in the temperature of said atmosphere, testing the extent of said reaction between said gas and said control agent, and adjusting the concentration of said gas in said atmosphere as the necessity for this is indicated by the extent of said reaction between said gas and said agent.

7. An apparatus for gassing fruit comprising: means for liberating a treating gas into the atmosphere surrounding said fruit; means for exposing a testing liquid containing orthotolidine to said atmosphere for reaction with said gas; means for heating said testing liquid to maintain it within a range of temperatures which will prevent any substantial fluctuation of the reaction between said liquid and said gas in response to fluctuations in the temperature of said atmosphere; and means automatically responsive to the reaction between said treating gas and said testing liquid for regulating the liberation of said gas in accordance with the degree of said reaction.

8. An apparatus for gassing fruit comprising: means for liberating a treating gas into the surrounding atmosphere; means for exposing a testing liquid containing orthotolidine to said atmosphere for reaction with said gas; means for regulating the liberation of said gas in accordance with the degree of reaction between said treating gas and testing liquid; and means for heating said testing liquid to facilitate uniformity of reaction between it and the gas in said atmosphere.

9. In an apparatus for use in the gas treatment of fruit under varying temperature conditions, the combination of: means forming a chamber in which said fruit is adapted to be confined; means for liberating a treating gas into the atmosphere surrounding said fruit; means for holding a supply of liquid orthotolidine control agent which is adapted to react with said gas; a tube having a capillary duct therein for delivering control agent from said supply means to open and free contact with said atmosphere; means for heating said tube to maintain the control agent discharged therefrom within a range of temperatures in which the reaction between said agent and the gas in said atmosphere will be substantially uniformly in proportion to the concentration of said gas in said atmosphere, regardless of the fluctuations in the temperature of said atmosphere; automatic means for testing the extent of said reaction between said gas and said control agent; and means for automatically varying the supply of gas to said atmosphere in response to the extent of said reaction between the gas of said atmosphere and said control agent to maintain the concentration of said gas within predetermined limits.

10. In an apparatus for use in the gas treatment of fruit under varying temperature conditions, the combination of: means for liberating a treating gas in the atmosphere surrounding said fruit; means for passing an orthotolidine control agent through said atmosphere while in free contact with said atmosphere, said control agent being adapted to react with said gas; means for heating said control agent to maintain this at the time it so contacts said atmosphere within a range of temperatures in which the reaction between said control agent and the gas in said atmosphere will be substantially uniformly in proportion to the concentration of said gas in said atmosphere, regardless of the fluctuations in the temperature of said atmosphere; automatic means for testing the extent of said reaction between said gas and said control agent; and means for automatically varying the supply of gas to said atmosphere in response to the extent of said reaction between the gas of said atmosphere and said control agent to maintain the concentration of said gas within predetermined limits.

11. In an apparatus for use in the gas treatment of fruit under varying temperature conditions, the combination of: means for liberating a treating gas in the atmosphere surrounding said fruit; means for passing an orthotolidine control agent through said atmosphere while in free contact with said atmosphere, said control agent being adapted to react with said gas; means for heating said control agent; thermostatic means for controlling said heating means to maintain said control agent at the time it so contacts said atmosphere within a range of temperatures in which the reaction between said control agent and the gas in said atmosphere will be substantially uniformly in proportion to the concentration of said gas in said atmosphere, regardless of the fluctuations in the temperature of said atmosphere; automatic means for testing the extent of said reaction between said gas and said control agent; and means for automatically varying the supply of gas to said atmosphere in response to the extent of said reaction between the gas of said atmosphere and said control agent to maintain the concentration of said gas within predetermined limits.

ARTHUR F. KALMAR.
WILLIAM R. HUGUENIN.